Feb. 26, 1935.  W. W. BROWNE  1,992,648
DEVICE FOR APPLYING MEDICAMENTS OR DISINFECTANTS TO FEET
Filed May 21, 1932
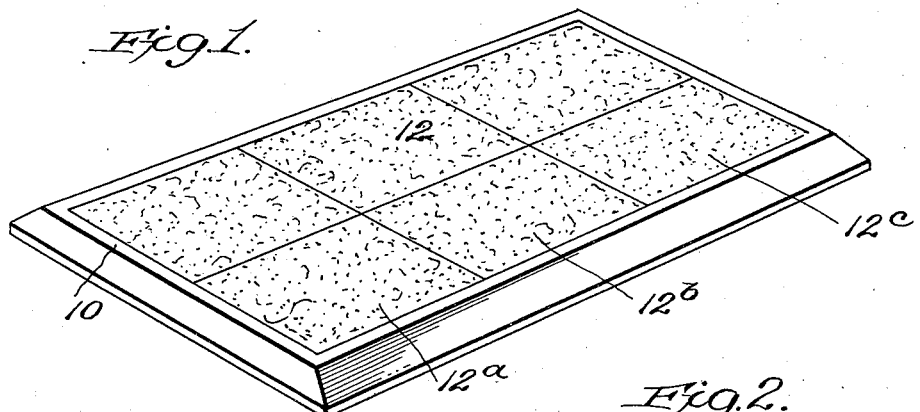
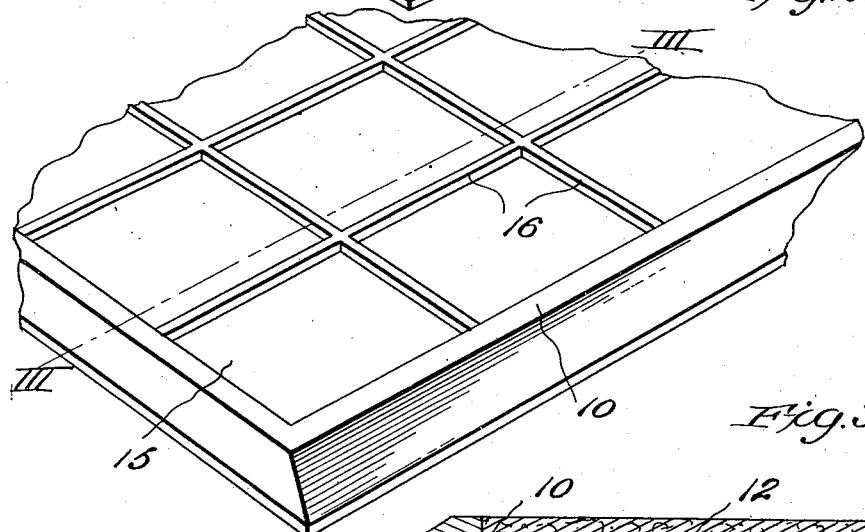
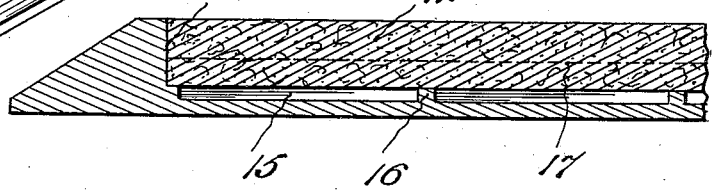
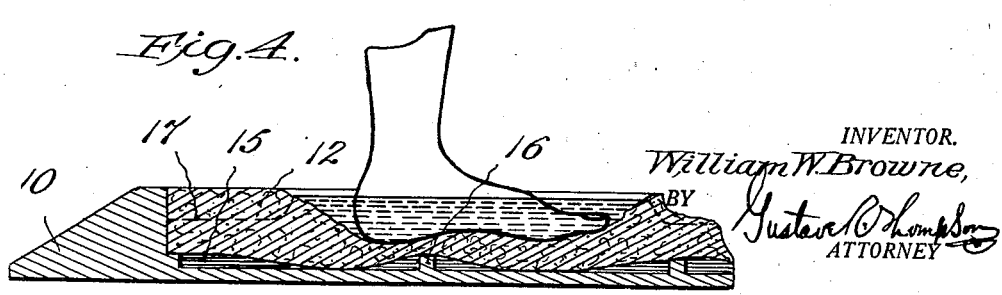
INVENTOR.
William W. Browne,
BY
Gustave B. Thompson
ATTORNEY Patented Feb. 26, 1935

1,992,648

UNITED STATES PATENT OFFICE 1,992,648

DEVICE FOR APPLYING MEDICAMENTS OR DISINFECTANTS TO FEET

William W. Browne, Yonkers, N. Y.

Application May 21, 1932, Serial No. 612,696

4 Claims. (Cl. 4—177)

This invention relates to devices for applying medicaments or disinfectants to feet and provides improvements therein.

With the use of swimming pools, shower-baths, etc. by crowds, a disease known as "athlete's foot" has become quite prevalent, and its spread has been difficult to control.

The present invention provides a device which is effective in disinfecting feet to prevent the spread of diseases caused by spores and germs carried by the feet, and of simple construction. It further provides a device which is convenient to use, and functions by the mere incident of a person walking upon the device.

It further provides a device which is comfortable to the feet; which, while making use of a solution, is not slippery; and which acts to minimize the solution carried off on the feet and tracked or left on the walk or floor.

It further provides a device readily susceptible to sanitary care.

An embodiment of the invention is illustrated in the accompanying drawing.

Figure 1 is a perspective view of the device looking down from the top thereof;

Fig. 2 is a perspective view of one corner of the device, on an enlarged scale, showing the mat removed;

Fig. 3 is a vertical sectional view on the line 3—3, Fig. 2.

Fig. 4 is a vertical sectional view similar to Fig. 3, illustrating the mode of use of the device.

Referring to said drawing:—

Numeral 10 designates a receptacle, which may comprise a depression in a floor or walk, or be a low-walled container, of molded rubber for example, and containing in use a disinfecting or medicating solution, such for example as a solution of sodium hypochlorite or of salicylic acid.

In the receptacle 10 there is placed a mat 12 of suitable compressible or resilient material and preferably having numerous interstices opening upon its upper surface, such for example as a mat of spongy rubber.

The mat 12 may be and preferably is formed of a plurality of sections 12ª, 12ᵇ, 12ᶜ, etc., and the mat, whether in one piece, or in a plurality of sections, is removable from the receptacle 12. The bottom surface of the receptacle 12 is preferably arranged with the plurality of pockets 15, which may be formed in part by a plurality of ribs or lands 16 on the bottom of the receptacle, which ribs or lands serve to support the bottom of the mat 12 spaced somewhat from the bottom of receptacle 10.

The receptacle 10 is preferably filled with solution to a level somewhat below the upper surface of the mat 12, as indicated by the dotted line 17, Fig. 3.

The mat 12 yields under the weight of a person stepping thereon to bring about a bathing by or a flow of the disinfecting solution in the receptacle upon or over the foot standing on the mat 12. When made of a spongy material, the mat 12 may be for example from one to four inches thick.

When a person steps on the mat, the mat yields and is also compressed when made of spongy material, allowing the foot to sink into the solution, and also causing the solution to flow upwardly through the openings or interstices in the mat. The yielding or compression of the sponge mat also causes the disinfecting solution to be squirted through the openings or interstices against the foot, thus forcing the solution between the toes, etc., so as to forcibly reach the parts most usually infected.

The pockets 15 containing the disinfecting solution, provide local reservoirs from which a copious supply of the disinfecting solution can be forced upwardly, and when the pressure of the foot is relieved, the pockets 15 receive the excess liquid from the mat and hasten the return of the liquid flooding the surface of the mat, to the receptacle. The resiliency of the mat 12 has the further effect of minimizing the amount of disinfecting solution carried away on the foot after the person steps off of the mat. The mat accomplishes this, because when the foot is lifted from the mat, the mat springs back into its original form, creating a suction below the mat and in the upper portion thereof when of spongy material, thus drawing the disinfecting solution from the foot which is being lifted.

The device can be of various sizes; it is preferably of such size that a person must put each foot down at least once, before stepping off of the mat.

The disinfecting device is preferably so placed that a person entering a room containing a swimming pool, or entering a walk at the edges of a swimming pool, or entering a shower bath room, would necessarily have to wolk over and step upon the mat 12.

The mat 12 being compressible and spongy, is not slippery and the device therefore has the advantage that all danger of slipping by the person walking on the mat is avoided.

The solution level in the receptacle 10 being somewhat below the surface of the mat 12, as heretofore explained, the surface of the mat when not in use is relatively dry, and evaporation is considerably reduced.

The mat 12 can be removed from the receptacle from time to time and squeezed and rinsed, to cleanse the same. The formation of the mat 12 in sections 12ᵃ, etc. facilitates this removal and cleansing.

The invention may receive various other embodiments than that herein specifically illustrated and described.

What is claimed is:—

1. A device for applying disinfectants or medicaments to feet comprising a receptacle for a disinfectant solution, and a resilient mat in said receptacle yieldable under the weight of a person stepping thereon to force the solution to the surface and to bring the foot into the solution, said receptacle having a plurality of solution pockets below said mat to limit the flow away from the zone under the foot bearing thereon.

2. A medicament holding and applying medium for the feet comprising a container, and a medicament applicator in the bottom of the container, said medium being adapted to apply medicament to the foot when the foot is pressed directly thereon.

3. An apparatus for applying medicament to the foot, comprising a container, and compressible medicament holding and applying means in the bottom of the container, adapted to contain a quantity of medicament and to express the medicament upon the foot according as the foot is pressed directly thereon.

4. An apparatus for applying medicament or the like to the foot comprising a container, and sponge-like medicament holding and applying means on the bottom of the container upon which the foot is adapted to be directly pressed to express in the desired quantity therefrom and upon the foot medicament or the like contained in the applicator means.

WILLIAM W. BROWNE.